US011882412B2

(12) United States Patent
Yang et al.

(10) Patent No.: US 11,882,412 B2
(45) Date of Patent: Jan. 23, 2024

(54) AUDITION OF HEARING DEVICE SETTINGS, ASSOCIATED SYSTEM AND HEARING DEVICE

(71) Applicant: GN Hearing A/S, Ballerup (DK)

(72) Inventors: Qi Yang, Chicago, IL (US); Greg Olsen, Villa Park, IL (US); Shira Hahn, Wilmette, IL (US); Bill Chang, Westmont, IL (US)

(73) Assignee: GN HEARING A/S, Ballerup (DK)

( * ) Notice: Subject to any disclaimer, the term of this patent is extended or adjusted under 35 U.S.C. 154(b) by 116 days.

(21) Appl. No.: 17/323,846

(22) Filed: May 18, 2021

(65) Prior Publication Data

US 2021/0297797 A1 Sep. 23, 2021

Related U.S. Application Data

(63) Continuation of application No. 15/615,235, filed on Jun. 6, 2017, now Pat. No. 11,032,656.

(51) Int. Cl.
*H04R 25/00* (2006.01)

(52) U.S. Cl.
CPC .......... *H04R 25/70* (2013.01); *H04R 25/407* (2013.01); *H04R 25/505* (2013.01); *H04R 25/43* (2013.01);

(Continued)

(58) Field of Classification Search
CPC .... H04R 25/70; H04R 25/407; H04R 25/505; H04R 25/43; H04R 25/558; H04R 2225/61

(Continued)

(56) References Cited

U.S. PATENT DOCUMENTS 9,288,584 B2 3/2016 Hansen et al.
9,584,928 B2 2/2017 Laudanski et al.

(Continued)

FOREIGN PATENT DOCUMENTS

CN 101287031 10/2008
CN 105764018 7/2016

(Continued)

OTHER PUBLICATIONS

EP communication pursuant to Article 94(3) for European patent application No. 18169407.6 dated Aug. 30, 2023.

(Continued)

*Primary Examiner* — Phylesha Dabney
(74) *Attorney, Agent, or Firm* — Vista IP Law Group, LLP

(57) ABSTRACT

A hearing system includes a hearing device, the hearing device comprising: an input module for providing a first input signal, the input module comprising a first microphone; a processor for processing the first input signal and providing a processor output signal based on the first input signal; and a receiver for providing an audio output signal based on the processor output signal; wherein the hearing system is configured to obtain a user input indicative of a change from a first primary setting to a first secondary setting of the hearing device, and wherein the hearing device, upon a detection of the change from the first primary setting to the first secondary setting, is configured to output a secondary audio output signal according to the first secondary setting.

42 Claims, 6 Drawing Sheets

(52) U.S. Cl.
CPC ........ *H04R 25/558* (2013.01); *H04R 2225/61* (2013.01)

(58) Field of Classification Search
USPC .......................................................... 381/312
See application file for complete search history.

(56) References Cited

U.S. PATENT DOCUMENTS

| | | | |
|---|---|---|---|
| 9,712,928 B2 | 7/2017 | Pedersen et al. | |
| 10,149,075 B2 | 12/2018 | Porsbo et al. | |
| 2005/0196002 A1 | 9/2005 | Hagen et al. | |
| 2009/0028362 A1 | 1/2009 | Frohlich et al. | |
| 2010/0235747 A1 | 9/2010 | Young | |
| 2011/0142273 A1 | 6/2011 | Iwano et al. | |
| 2014/0369538 A1 | 12/2014 | Norris et al. | |
| 2015/0036853 A1 | 2/2015 | Solum et al. | |
| 2017/0257712 A1 | 9/2017 | Porsbo et al. | |
| 2018/0352352 A1* | 12/2018 | Yang | H04R 25/505 |
| 2020/0107139 A1* | 4/2020 | Lugger | H04R 25/505 |

FOREIGN PATENT DOCUMENTS

| | | |
|---|---|---|
| EP | 2 919 483 A1 | 9/2015 |
| EP | 2928215 | 10/2015 |
| EP | 3 082 350 A1 | 10/2016 |
| WO | WO 2004/004414 A1 | 1/2004 |
| WO | WO 2008/009142 A1 | 1/2008 |
| WO | WO 2015/109002 A2 | 7/2015 |

OTHER PUBLICATIONS

Final Office Action for U.S. Appl. No. 15/615,235 dated Nov. 13, 2020.

Final Office Action for U.S. Appl. No. 15/615,235 dated Feb. 19, 2020.

Non-Final Office Action for U.S. Appl. No. 15/615,235 dated Jun. 25, 2020.

Non-Final Office Action for U.S. Appl. No. 15/615,235 dated Sep. 16, 2019.

Non-Final Office Action for U.S. Appl. No. 15/615,235 dated Jan. 10, 2019.

Notice of Allowance for U.S. Appl. No. 15/615,235 dated Feb. 4, 2021.

Extended Search Report dated Aug. 21, 2018 for corresponding European Patent Application No. 18169407.6.

First Examination Search Report dated May 31, 2018 for corresponding Danish Application No. PA 2017 70605.

Foreign Office Action dated Dec. 25, 2020 for Chinese Patent Application No. 201810564966.6.

* cited by examiner

AUDITION OF HEARING DEVICE SETTINGS, ASSOCIATED SYSTEM AND HEARING DEVICE

RELATED APPLICATION DATA

This application is a continuation of U.S. patent application Ser. No. 15/615,235 filed on Jun. 6, 2017, now U.S. Pat. No. 11,032,656. The entire disclosure of the above application is expressly incorporated by reference herein.

FIELD

The present disclosure relates to audition or evaluation of hearing device settings in a hearing system, and in particular a hearing system, accessory device and a method of evaluating a setting of a hearing device.

BACKGROUND

In the field of hearing devices, explaining to users what digital signal processing (DSP) settings do is difficult since many users do not have precise or consistent vocabulary for audio effects (labelling/naming in software user interface is difficult). In hearing device applications where the sound source is external/environmental, the sound input is not always present or appropriate for demonstrating the effects of sound processing. For example, a user adjusting noise reduction settings on a hearing device will have difficulty perceiving the difference the new setting is making if the environment is not noisy, or the environmental noise changes as settings are being adjusted. This lack of clear feedback impedes the user from trying and using DSP features that might improve the audio quality, since they might not understand what the feature is doing or have confidence that the feature is actually effective.

US 2009/0028362 relates to a hearing device with a visualized psychoacoustic variable and corresponding method. The setting and/or adjustment of a hearing device for a user is provided. The hearing device includes a signal processing facility for processing an input sound to form an output sound, with a perceptive model being implemented in the signal processing facility or in a processing facility connected in a data link therewith, with which perceptive model a psychoacoustic variable can be provided in respect of the output sound. A visualization facility, for instance integrated in a remote control comprising the processing facility, is preferably wirelessly connected to the signal processing facility. A value of the psychoacoustic variable can thus be visualized accordingly.

SUMMARY

Accordingly, there is a need for hearing systems, methods and hearing devices which provide improved and clear feedback on setting adjustment to a user of a hearing device.

A hearing system is disclosed, the hearing system comprising a hearing device and/or an accessory device, the hearing device comprising an input module for provision of a first input signal, the input module comprising a first microphone; a processor for processing the first input signal and provision of a processor output signal based on the first input signal; and a receiver for converting an output signal based on the processor output signal to an audio output signal. The hearing system is configured to receive and detect a user input indicative of a change from a first primary setting to a first secondary setting of the hearing device.

Further, the hearing device may, e.g. upon or after detection of the change from the first primary setting to the first secondary setting, be configured to output a secondary audio output signal according to the first secondary setting and/or the first primary setting.

Further, a method of evaluating a setting of a hearing device in a hearing system comprising the hearing device and/or an accessory device is disclosed, the hearing device comprising an input module for provision of a first input signal, the input module comprising a first microphone; a processor for processing the first input signal and provision of a processor output signal based on the first input signal; and a receiver for converting an output signal based on the processor output signal to an audio output signal. The method comprises receiving and detecting a user input indicative of a change from a first primary setting to a first secondary setting of the hearing device, and upon detection of the change from the first primary setting to the first secondary setting, outputting a secondary audio output signal with the receiver according to the first secondary setting.

An accessory device for or forming part of a hearing system comprising a hearing device is disclosed, the accessory device comprising an accessory device user interface and a processor, wherein the accessory device user interface is configured to receive and detect a user input indicative of a change from a first primary setting to a first secondary setting of the hearing device, and wherein the processor, e.g. upon detection of the change from the first primary setting to the first secondary setting, is configured to control the hearing device to output a secondary audio output signal according to the first secondary setting.

The hearing systems and methods disclosed herein provide immediate or real-time audio feedback to a user, when the user changes setting(s) of a hearing device. Thus, the user can reliably and efficiently evaluate the effect of new hearing device setting(s).

Audio effects preview alleviates the problem of explaining sound processing effects to users by sidestepping the issue of finding consistent and precise vocabulary for most users. Live and direct audio demonstrations show the user the effectiveness of the processing effects, and help them select an optimal setting better when the current environmental sound is not present or is not ideal for understanding what the effects are doing. Further, demonstration using live sound/audio can be more effective in communicating to the user.

The present hearing systems, devices and methods provide improved and clear feedback on setting adjustment to a user of a hearing device.

An extension to the graphical and/or physical interface that is typically used to adjust hearing device settings (such as EQ, noise reduction etc.) on hearing devices is provided. The hearing system will generate or output a demonstration audio signal when the controls (e.g. slider, knob or buttons) are manipulated, so that the effects of the adjustment can be heard clearly.

It is an important advantage of the present disclosure that sonification is used for feedback to a user on user input. In this context sonification is the use of non-speech audio to convey information or perceptualize data. Auditory perception has advantages in temporal, spatial, amplitude, and frequency resolution that open possibilities as an alternative or complement to visualization techniques.

A hearing system includes a hearing device, the hearing device comprising: an input module for providing a first input signal, the input module comprising a first microphone; a processor for processing the first input signal and providing a processor output signal based on the first input signal; and a receiver for providing an audio output signal based on the processor output signal; wherein the hearing system is configured to obtain a user input indicative of a change from a first primary setting to a first secondary setting of the hearing device, and wherein the hearing device, upon a detection of the change from the first primary setting to the first secondary setting, is configured to output a secondary audio output signal according to the first secondary setting.

Optionally, the hearing system is configured to, prior to the detection of the change from the first primary setting to the first secondary setting, output a primary audio output signal according to the first primary setting.

Optionally, the hearing system comprises an accessory device wirelessly connectable to the hearing device, the accessory device comprising an accessory device user interface, the accessory device user interface configured to obtain the user input indicative of the change from the first primary setting to the first secondary setting of the hearing device.

Optionally, the accessory device is configured to: determine a secondary output signal representative of the secondary audio output signal, and wirelessly transmit the secondary output signal to the hearing device.

Optionally, the accessory device comprising a loudspeaker, wherein the accessory device is configured to: obtain a secondary audio input signal for the hearing device, and output the secondary audio input signal via the loudspeaker.

Optionally, the accessory device is configured to, upon the detection of the change from the first primary setting to the first secondary setting, wirelessly transmit a control signal for controlling the hearing device to output the secondary audio output signal.

Optionally, the hearing device is configured to select the secondary audio output signal from a plurality of audio output signals in a memory of the hearing device based on the first secondary setting.

Optionally, the first secondary setting comprises one or more gain parameters of the hearing device.

Optionally, the first secondary setting comprises one or more filter parameters of the hearing device.

Optionally, the first secondary setting comprises one or more beamforming parameters of the hearing device.

Optionally, the first secondary setting comprises one or more noise cancellation parameters of the hearing device.

Optionally, the first secondary setting comprises one or more equalizer parameters of the hearing device.

Optionally, the hearing system is configured to obtain a user input indicative of a change from a second primary setting to a second secondary setting of the hearing device, and wherein the hearing device, upon a detection of the change from the second primary setting to the second secondary setting, is configured to output the secondary audio output signal according to the second secondary setting.

A method performed by a hearing system comprising a hearing device, the hearing device comprising an input module for providing a first input signal, the input module comprising a first microphone, a processor for processing the first input signal and providing a processor output signal based on the first input signal, and a receiver for providing an audio output signal based on the processor output signal, the method includes: obtaining a user input indicative of a change from a first primary setting to a first secondary setting of the hearing device, and upon a detection of the change from the first primary setting to the first secondary setting, outputting a secondary audio output signal with the receiver according to the first secondary setting.

An accessory device for a hearing system comprising a hearing device, includes: an accessory device user interface and a processor, wherein the accessory device user interface is configured to obtain a user input indicative of a change from a first primary setting to a first secondary setting of the hearing device, and wherein the processor, upon a detection of the change from the first primary setting to the first secondary setting, is configured to control the hearing device to output a secondary audio output signal according to the first secondary setting.

Other features will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
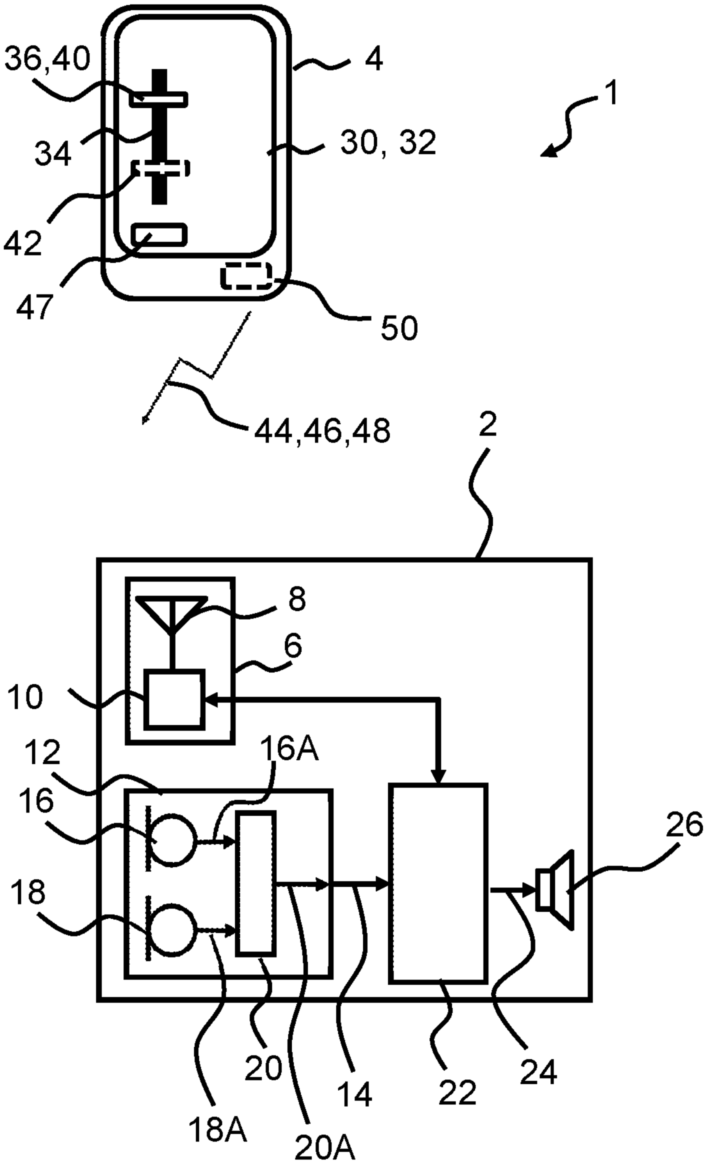
FIG. 1 schematically illustrates an exemplary hearing system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing system comprising a hearing device is disclosed. The hearing device may be a hearing aid or a hearable. The hearing device may be of the behind-the-ear (BTE) type, in-the-ear (ITE) type, in-the-canal (ITC) type, receiver-in-canal (RIC) type or receiver-in-the-ear (RITE) type. The processor may be configured to compensate for hearing loss of a user. The hearing aid may be a binaural hearing aid. The hearing system may comprise an accessory device. The accessory device may be a mobile phone, such as a smartphone. The accessory device may be a remote control device.

The hearing device comprises an input module for provision of a first input signal, the input module comprising a first microphone for provision of a first microphone signal. The first microphone signal may be the first input signal. The input module may comprise a second microphone for provision of a second microphone signal. The input module may comprise a first beamformer for provision of a beamform signal. The first beamformer may be connected to the first microphone and the second microphone and configured to provide a beamform signal based on the first microphone signal and the second microphone signal. The beamform signal from the first beamformer may be the first input signal. Thus, the input module optionally comprises a second microphone and a first beamformer, wherein the first beamformer is connected to the first microphone and the second microphone and configured to provide a beamform signal based on first and second microphone signals as the first input signal.

The hearing device comprises a processor for processing the first input signal and provision of a processor output signal based on the first input signal.

The hearing device comprises a receiver for converting an output signal based on the processor output signal to an audio output signal.

The hearing device optionally comprises a transceiver module for communication (receive and/or transmit) with an accessory device and/or a contralateral hearing device of the hearing system. The transceiver module may comprise an antenna for converting one or more wireless input signals from the accessory device to an antenna output signal. The transceiver module optionally comprises a radio transceiver coupled to the antenna for converting the antenna output signal to a transceiver input signal. The transceiver input signal may comprise an audio stream and/or one or more control signals from accessory device and/or contralateral hearing device. The transceiver module may comprise a plurality of antennas and/or an antenna may be configured to be operate in one or a plurality of antenna modes.

The hearing system is configured to receive and detect a user input indicative of a change from a first primary setting to a first secondary setting of the hearing device. Accordingly, the hearing system may comprise one or more user interfaces for receiving and/or detecting a user input. For example, the hearing device may comprise a hearing device user interface receiving a user input. The hearing device user interface may comprise one or more buttons and/or a voice control unit. The accessory device may comprise an accessory device user interface. The accessory device user interface may comprise a touch sensitive surface, e.g. a touch display, and/or one or more buttons. The accessory device user interface may comprise a voice control unit. The hearing device user interface may comprise one or more physical sliders, knobs and/or push buttons. The accessory device user interface may comprise one or more physical or virtual (on-screen) sliders, knobs and/or push buttons.

In one or more exemplary hearing systems, the hearing device, e.g. upon detection of the change from the first primary setting to the first secondary setting, is configured to output a secondary audio output signal, e.g. according to the first secondary setting.

The hearing system, such as the hearing device, may be configured to, e.g. prior to detection of the change from the first primary setting to the first secondary setting and/or prior to output of the secondary audio output signal, output a primary audio output signal, optionally according to the first primary setting. The primary audio output signal may be different from the secondary audio output signal. Outputting a primary output signal prior to detection of the change and/or output of the secondary audio output signal allows the user to immediately compare and evaluate whether the change in hearing device settings provides an improved listening experience.

A setting, such as the first primary setting and/or the first secondary setting, may comprise one or more gain parameters of the hearing device.

A setting, such as the first primary setting and/or the first secondary setting, may comprise one or more filter parameters of the hearing device.

A setting, such as the first primary setting and/or the first secondary setting, may comprise one or more beamforming parameters of the hearing device.

A setting, such as the first primary setting and/or the first secondary setting, may comprise one or more noise cancellation parameters of the hearing device.

A setting, such as the first primary setting and/or the first secondary setting, may comprise one or more equalizer parameters of the hearing device.

A setting, such as the first primary setting and/or the first secondary setting, may comprise one or more parameters of the hearing device for managing or relieving tinnitus (Tinnitus Masker).

A setting, such as the first primary setting and/or the first secondary setting, may comprise one or more frequency lowering parameters of the hearing device.

A setting, such as the first primary setting and/or the first secondary setting, may comprise one or more expansion parameters of the hearing device.

A setting, such as the first primary setting and/or the first secondary setting, may comprise one or more compression parameters of the hearing device.

A setting, such as the first primary setting and/or the first secondary setting, may comprise one or more parameters of the hearing device for increasing spatial awareness.

A setting, such as the first primary setting and/or the first secondary setting, may comprise one or more parameters of the hearing device for increasing listening comfort.

A setting, such as the first primary setting and/or the first secondary setting, may comprise one or more parameters of the hearing device for increasing situational awareness.

For example, the first primary setting may comprise a first gain parameter with a first value in the first primary setting and a second value different from the first value in the first secondary setting.

For example, the first primary setting may comprise a first noise cancellation parameter with a first value in the first primary setting and a second value different from the first value in the first secondary setting.

For example, the first primary setting may comprise a first beamforming parameter with a first value in the first primary setting and a second value different from the first value in the first secondary setting.

For example, the first primary setting may comprise a first equalizer parameter with a first value in the first primary setting and a second value different from the first value in the first secondary setting.

For example, the first primary setting may comprise a first filter parameter with a first value in the first primary setting and a second value different from the first value in the first secondary setting.

The accessory device may be configured to determine a primary output signal representative of the primary audio output signal, optionally based on the first primary settings, and wirelessly transmit the primary output signal to the hearing device. Wireless transmission of the primary output signal to the hearing device enables evaluation with limited or no noise from surroundings and/or reduced signal processing/memory in the hearing device. The accessory device optionally comprises a transceiver module for wireless communication (receive and/or transmit) with one or more hearing devices of the hearing system. The transceiver module is connected to the processor and may comprise an antenna for transmitting and/or receiving one or more wireless signals to/from the hearing device. The transceiver module optionally comprises a radio transceiver coupled to the antenna. The transceiver module may comprise a plurality of antennas and/or an antenna may be configured to be operate in one or a plurality of antenna modes.

The accessory device may comprise a loudspeaker, wherein the accessory device is optionally configured to obtain a primary audio input signal for the hearing device, and output the primary audio input signal via the loudspeaker. The accessory device may be configured to output the primary audio input signal via the loudspeaker upon detection of activation of a setting adjustment mode in the accessory device.

To obtain a primary audio input signal for the hearing device may comprise to determine a primary audio input signal for the hearing device based on the first primary setting and/or the first secondary setting. The primary audio input signal may be representative of the primary audio output signal.

The accessory device may be configured to, e.g. prior to detection of the change from the first primary setting to the first secondary setting, wirelessly transmit a control signal for controlling the hearing device to output the primary audio output signal. The accessory device may be configured to, e.g. upon detection of activation of a setting adjustment mode in the accessory device, wirelessly transmit a control signal for controlling the hearing device to output the primary audio output signal.

The hearing system optionally comprises an accessory device. The accessory device may be wirelessly connectable to the hearing device and optionally comprises an accessory device user interface. The accessory device user interface may be configured to receive and detect the user input indicative of a change from a first primary setting to a first secondary setting of the hearing device.

The accessory device may be configured to determine a secondary output signal representative of the secondary audio output signal, optionally based on the first secondary settings, and wirelessly transmit the secondary output signal to the hearing device. Wireless transmission of the secondary output signal to the hearing device enables evaluation with limited or no noise from surroundings.

The accessory device may comprise a loudspeaker, wherein the accessory device is optionally configured to obtain a secondary audio input signal for the hearing device, and output the secondary audio input signal via the loudspeaker. The secondary audio input signal may be constant.

To obtain a secondary audio input signal for the hearing device may comprise to determine a secondary audio input signal for the hearing device based on the first primary setting and/or the first secondary setting. The secondary audio input signal may be representative of the secondary audio output signal.

The accessory device may be configured to, e.g. upon detection of the change from the first primary setting to the first secondary setting, wirelessly transmit a control signal for controlling the hearing device to output the secondary audio output signal e.g. by changing the sound processing settings (gain, filter, noise cancellation etc.) on the hearing device, e.g. so that the audio output signal from the hearing device when based on an input signal earlier sounds different.

The control signal transmitted from the accessory device to the hearing device may be indicative of the first secondary setting.

The control signal transmitted from the accessory device to the hearing device may be indicative of the secondary audio output signal. For example, the hearing device may be configured to generate and/or output the secondary audio output signal, e.g. based on audio output signals and/or audio output properties stored in memory of the hearing device, in response to receipt of the control signal from the accessory device. The secondary audio output signal may be selected and/or generated from a number, e.g. at least two, three or more, of different secondary audio output signals/audio output properties stored in the memory of the hearing device, e.g. based on the control signal from the accessory device.

In one or more exemplary hearing systems, wireless transmission of a control signal to the hearing device may be combined with output of the secondary audio input signal via the loudspeaker. The secondary audio input signal may be constant. Thus, the hearing device can be controlled, e.g. to apply the first secondary setting to the secondary audio input or to apply a default setting to the secondary audio input. Application of a default setting may be used in exemplary hearing systems, where the accessory device tailors the secondary audio input signal In one or more exemplary hearing systems, wireless transmission of a control signal to the hearing device may be combined with wireless transmission of the secondary output signal to the hearing device.

The hearing device may be configured to select the secondary audio output signal from a plurality of audio output signals in a memory of the hearing device based on the first secondary setting.

The hearing system may be configured to receive and detect a user input indicative of a change from a second primary setting to a second secondary setting of the hearing device. The hearing device may, e.g. upon detection of the change from the second primary setting to the second secondary setting, be configured to output the secondary audio output signal according to the second secondary setting.

The second primary setting and/or the second secondary setting may comprise one or more gain parameters of the hearing device. The second primary setting and/or the second secondary setting may comprise one or more filter parameters of the hearing device. The second primary setting and/or the second secondary setting may comprise one or more beamforming parameters of the hearing device. The second primary setting and/or the second secondary setting may comprise one or more noise cancellation parameters of the hearing device. The second primary setting and/or the second secondary setting may comprise one or more equalizer parameters of the hearing device.

In one or more exemplary hearing systems, e.g. with continuous controls such as knob and slider, the secondary audio output signal can be a continuous, consistent sound that starts as soon as the control is being adjusted (change in setting detected), and stays on until shortly after the last adjustment is made, e.g. until a setting adjustment mode is exited and/or the changed setting has been approved.

In one or more exemplary hearing systems, e.g. with discrete user interface parts such as buttons, the secondary audio output signal may be output for a period of time. Each successive press of the button may continue the audio output signal.

The hearing system, e.g. the accessory device or the hearing device, may be configured to receive and detect a user input indicative of approval of the first secondary setting of the hearing device, wherein the hearing device, upon detection of the accept of the first secondary setting, is configured to apply the first secondary setting in the hearing device. The user input indicative of approval of the first secondary setting of the hearing device may comprise user activation of an accept button on a user interface, such as the accessory device user interface. The user input indicative of approval of the first secondary setting of the hearing device may be detected as a user not changing the first secondary setting for an accept period. Thus, a user may accept the first secondary setting by not providing further input for an accept period. The accept period may be in the range from 10 to 40 seconds, such as about 15, 20, 25 or 30 seconds.

The accessory device may detect accept of the first secondary setting and transmits, optionally together with the first secondary setting, a control signal to the hearing device, the control signal being indicative of user accept. The hearing device receives the control signal indicative of user accept and then applies the first secondary settings in the hearing device and/or stores the first secondary settings in a memory.

Further, a method of evaluating a setting of a hearing device in a hearing system comprising the hearing device is disclosed, the hearing device comprising an input module for provision of a first input signal, the input module comprising a first microphone; a processor for processing the first input signal and provision of a processor output signal based on the first input signal; and a receiver for converting an output signal based on the processor output signal to an audio output signal.

The method comprises receiving and detecting, e.g. with a hearing device user interface of the hearing device or with an accessory device user interface of an accessory device of the hearing system, a user input indicative of a change from a first primary setting to a first secondary setting of the hearing device.

The method comprises, e.g. upon detection of the change from the first primary setting to the first secondary setting, outputting a secondary audio output signal with the receiver according to the first secondary setting.

The method may comprise, e.g. prior to detection of the change from the first primary setting to the first secondary setting and/or upon detecting activation of a setting adjustment mode in the accessory device, outputting a primary audio output signal according to the first primary setting.

FIG. 1 shows an exemplary hearing system. The hearing system 1 comprises a hearing device 2 and an accessory device 4. The hearing device 2 comprises a transceiver module 6 for (wireless) communication with the accessory device and optionally a contralateral hearing device (not shown in FIG. 1). The transceiver module 6 comprises antenna 8 and transceiver 10, and is configured for receipt and/or transmission of wireless signals from the accessory device 4. The hearing device 2 comprises an input module 12 for provision of a first input signal 14, the input module 12 comprising a first microphone 16 and a second microphone 18 for provision of a first microphone input signal 16A and a second microphone input signal 18A, respectively. The input module 12 optionally comprises a beamforming module 20 connected to the first microphone 16 and the second microphone 18 for receiving and processing the first microphone input signal 16A and the second microphone input signal 18A. The beamforming module 20 provides or outputs a beamform signal 20A based on the first microphone input signal 16A and the second microphone input signal 18A. The hearing device comprises a processor 22 and the beamform signal 20A is fed to the processor 22 as the first input signal 14. The processor 22 processes the first input signal 14 and provides a processor output signal 24 based on the first input signal 14. The hearing device 2 comprises a receiver 26 for converting an output signal based on the processor output signal 24 to an audio output signal.

The accessory device 4 is a smartphone and comprises an accessory device user interface 30 comprising a touch display 32, and a processor (not shown). The accessory device 4 is in a setting adjustment mode, where a user can adjust a setting of the hearing device.

The accessory device user interface 30 comprises a first virtual slider 34 with a handle 36. The accessory device user interface 30 is configured to receive and detect a user input indicative of a change from a first primary setting to a first secondary setting of the hearing device by a user contacting and dragging the handle 36 from a first position 40 corresponding to the first primary setting to a second position 42 corresponding to the first secondary setting.

Upon detection of the change from the first primary setting to the first secondary setting (handle 36 moved from first position 40 to second position 42), the processor of the accessory device is configured to determine a secondary output signal representative of the secondary audio output signal based on the first secondary setting, and wirelessly transmit the secondary output signal 44 to the hearing device. At the same time, the accessory device wirelessly transmits a control signal 46 to the hearing device 2. The hearing device, upon receipt of the control signal 46, switches to wireless streaming and optionally default hearing device settings, and outputs the secondary audio output signal by wirelessly receiving secondary output signal and streaming the secondary output signal 44. Thus, the secondary audio output signal is output according to the first secondary setting set by the user on the accessory device 4. It is to be noted, that the secondary output signal 44, the control signal 46 and the primary output signal 48 are wireless signals transmitted via transceiver module 50 of the accessory device. Thereby, an evaluation of first secondary setting is possible without the surrounding sounds influencing the audio signal presented to the user.

Further, the hearing system 1 in FIG. 1 is configured to, prior to detection of the change from the first primary setting to the first secondary setting, output a primary audio output signal according to the first primary setting. The processor of the accessory device 4, e.g. at entry into the setting adjustment mode, when the user makes contact with the handle 36 or when the user activates a (virtual) start button 47 on accessory device user interface 30 before changing the setting, is configured to determine a primary output signal representative of the primary audio output signal based on the first primary settings, and wirelessly transmit the primary output signal 48 to the hearing device. At the same time, the accessory device wirelessly transmits a control signal 46 to the hearing device 2. The hearing device, upon receipt of the control signal 46, switches to wireless streaming and optionally default hearing device settings, and outputs the primary audio output signal by wirelessly receiving primary output signal 48 and streaming the primary output signal 48. Thus, the primary audio output signal is output according to the first primary setting on the accessory device 4. The user accepts or approves the current setting, e.g. the first secondary setting, by activating a (virtual) accept button 49 (shown in FIG. 2) on accessory device user interface 30. Upon detection of the accept of the first secondary setting, the accessory device transmits a control signal indicative of user accept together with the first secondary setting to the hearing device. The hearing device receives the control signal indicative of user accept and then applies the first secondary settings in the hearing device and/or stores the first secondary settings in a memory of the hearing device.

Figure 2:
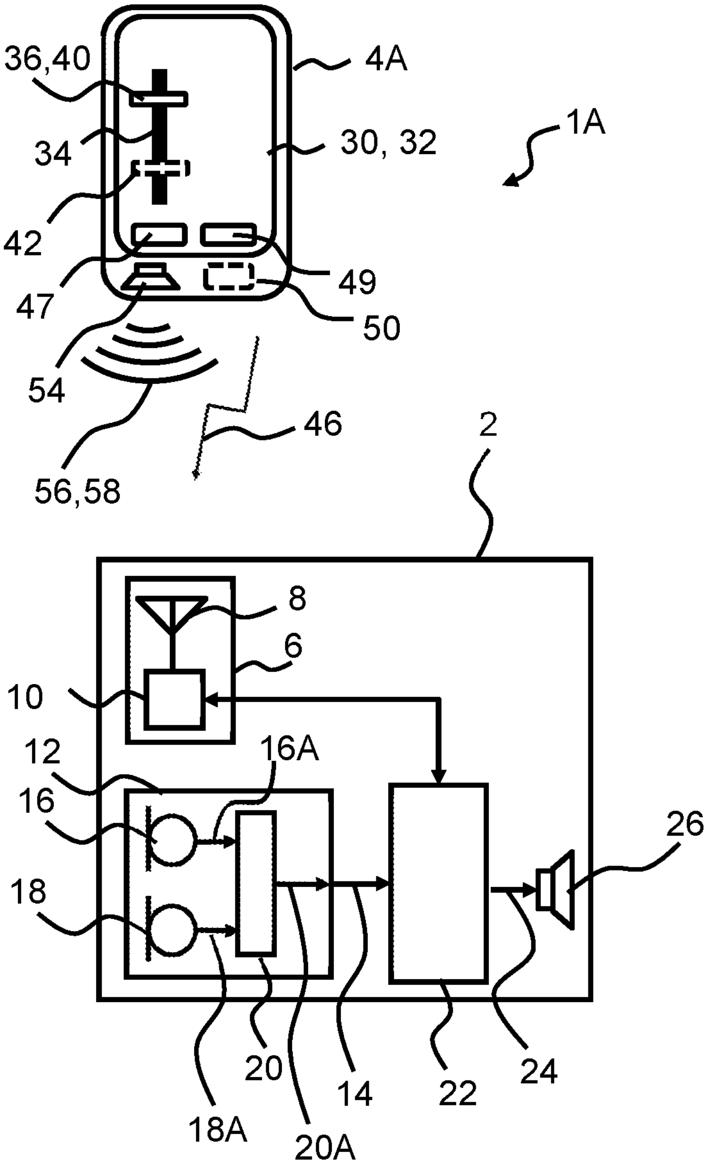
FIG. 2 schematically illustrates a further exemplary hearing system.

FIG. 2 shows another exemplary hearing system differing from the hearing system of FIG. 1. The hearing system 1A comprises a hearing device 2 and an accessory device 4A. The hearing device 2 comprises a transceiver module 6 for (wireless) communication with the accessory device and optionally a contralateral hearing device (not shown in FIG. 2). The transceiver module 6 comprises antenna 8 and transceiver 10, and is configured for receipt and/or transmission of wireless signals from the accessory device 4A. The hearing device 2 comprises an input module 12 for provision of a first input signal 14, the input module 12 comprising a first microphone 16 and a second microphone 18 for provision of a first microphone input signal 16A and a second microphone input signal 18A, respectively. The input module 12 optionally comprises a beamforming module 20 connected to the first microphone 16 and the second microphone 18 for receiving and processing the first microphone input signal 16A and the second microphone input signal 18A. The beamforming module 20 provides or outputs a beamform signal 20A based on the first microphone input signal 16A and the second microphone input signal 18A. The hearing device comprises a processor 22 and the beamform signal 20A is fed to the processor 22 as the first input signal 14. The processor 22 processes the first input signal 14 and provides a processor output signal 24 based on the first input signal 14. The hearing device 2 comprises a receiver 26 for converting an output signal based on the processor output signal 24 to an audio output signal.

The accessory device 4A is a smartphone and comprises an accessory device user interface 30 comprising a touch display 32, and a processor (not shown). The accessory device 4A is in a setting adjustment mode, where a user can adjust a setting of the hearing device. The accessory device 4A comprises a loudspeaker 54.

The accessory device user interface 30 comprises a first virtual slider 34 with a handle 36. The accessory device user interface 30 is configured to receive and detect a user input indicative of a change from a first primary setting to a first secondary setting of the hearing device by a user contacting and dragging the handle 36 from a first position 40 corresponding to the first primary setting to a second position 42 corresponding to the first secondary setting.

The processor of the accessory device is, e.g. upon detection of the change from the first primary setting to the first secondary setting (handle 36 moved from first position 40 to second position 42), configured to obtain a secondary audio input signal 56 for the hearing device, and output the secondary audio input signal 56 via the loudspeaker 54. At the same time, the accessory device 4A wirelessly transmits a control signal 46 to the hearing device 2. The control signal 46 may be indicative of the first secondary setting. The hearing device receives the secondary audio input signal 56 with the input module 12 and outputs the secondary audio output signal by processing the secondary audio input signal 56 in the hearing device, optionally in accordance with the control signal 46 and/or the first secondary setting. Thus, the secondary audio output signal is output according to the first secondary setting set by the user on the accessory device 4.

Further, the hearing system 1A in FIG. 2 is optionally configured to, prior to detection of the change from the first primary setting to the first secondary setting, output a primary audio output signal according to the first primary setting. The processor of the accessory device 4A, e.g. at entry into the setting adjustment mode, when the user makes contact with the handle 36 or when the user activates a (virtual) start button 47 on accessory device user interface 30 before changing the setting, is configured to obtain a primary audio input signal 58 for the hearing device, and output the primary audio input signal 58 via the loudspeaker 54. At the same time, the accessory device 4A wirelessly transmits a control signal 46 to the hearing device 2. The control signal 46 may be indicative of the first primary setting. The hearing device receives the primary audio input signal 58 with the input module 12 and outputs the primary audio output signal by processing the primary audio input signal 58 in the hearing device, optionally in accordance with the control signal 46 and/or the first primary setting. Thus, the primary audio output signal is output according to the first primary setting set by the user on the accessory device 4A. In one or more exemplary hearing systems, the control signal 46 comprises the current setting as indicated in the accessory device user interface and the primary audio input signal and the secondary audio input signal are the same signal. The user accepts or approves the current setting, e.g. the first secondary setting, by activating a (virtual) accept button 49 on accessory device user interface 30. Upon detection of the accept of the first secondary setting, the accessory device transmits a control signal indicative of user accept optionally together with the first secondary setting to the hearing device. The hearing device receives the control signal indicative of user accept and then applies the first secondary settings in the hearing device and/or stores the first secondary settings in a memory of the hearing device.

Figure 3:
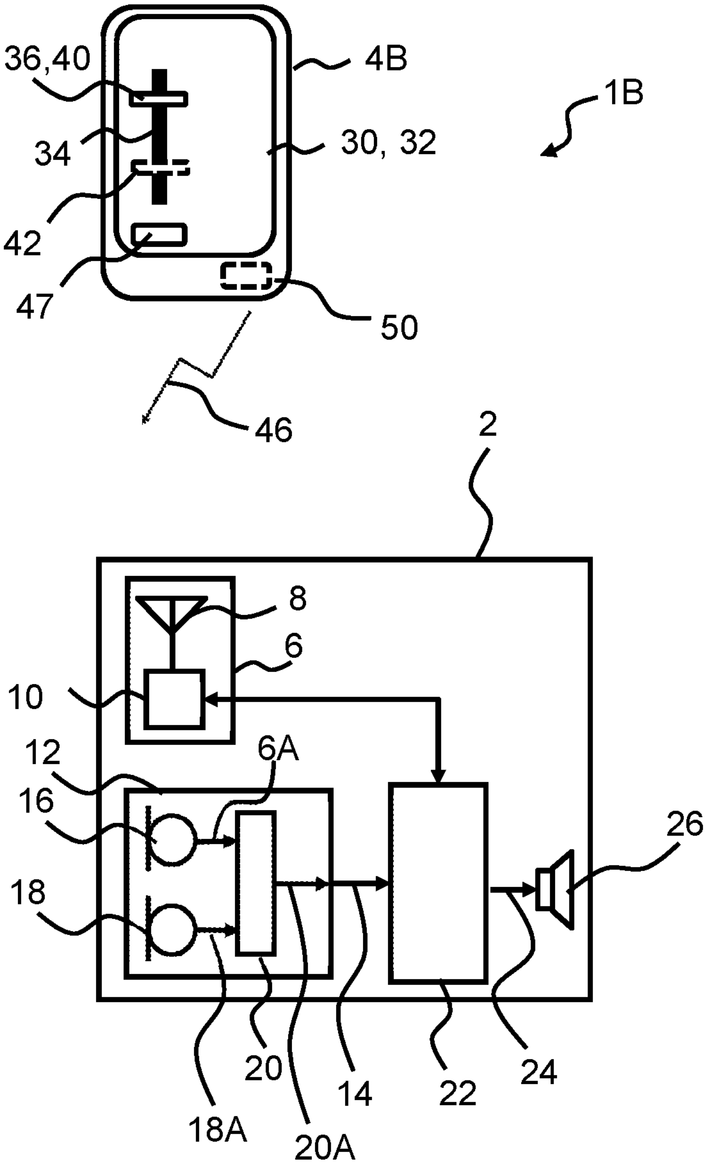
FIG. 3 schematically illustrates another exemplary hearing system.

FIG. 3 shows another exemplary hearing system. The hearing system 1B comprises a hearing device 2 and an accessory device 4B. The accessory device 4B is configured to, upon detection of the change from the first primary setting to the first secondary setting, wirelessly transmit a control signal for controlling the hearing device to output the secondary audio output signal. In hearing system 1B, the control signal 46 is indicative of the first secondary settings, and the hearing device 2 is configured to select the secondary audio output signal from a plurality of audio output signals in a memory of the hearing device based on the first secondary setting. The hearing device 2 outputs the selected secondary audio output signal via receiver 26.

Figure 4:
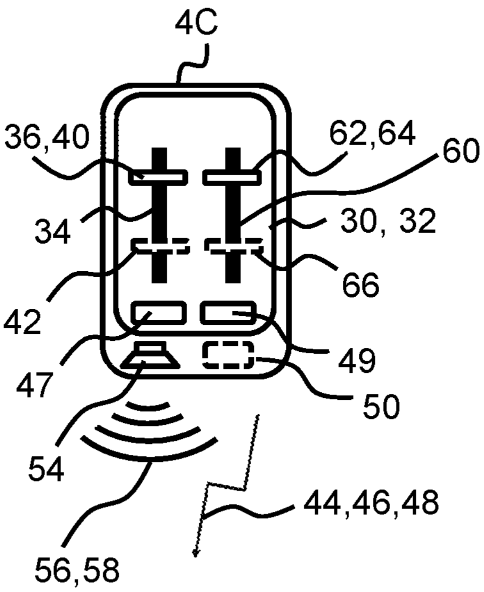
FIG. 4 schematically illustrates an exemplary accessory device.

FIG. 4 shows an exemplary accessory device of a hearing system. The accessory device 4C may be used in hearing systems 1, 1A, 1B. The accessory device 4C is a smartphone and comprises an accessory device user interface 30 comprising a touch display 32, and a processor (not shown). The accessory device 4C is in a setting adjustment mode, where a user can adjust a setting of the hearing device. The accessory device 4A comprises a loudspeaker 54.

In addition to the first virtual slider 34 as described in detail earlier, the accessory device user interface 30 comprises a second virtual slider 60 with a handle 62. The accessory device user interface 30 is configured to receive and detect a user input indicative of a change from a second primary setting to a second secondary setting of the hearing device by a user contacting and dragging the handle 62 from a first position 64 corresponding to the second primary setting to a second position 66 corresponding to the second secondary setting.

The accessory device 4C determines and transmits one or more of the signals 44, 46, 48, 56, 58 based on the second secondary setting and optionally the current first setting (first virtual slider 34). The hearing device of the hearing system is configured to output the secondary audio output signal based of one or more of the signals 44, 46, 48, 56, 58 e.g. as described in relation to FIGS. 1-3, and therefore according to the second secondary setting. The user accepts or approves the current first and second setting by activating a (virtual) accept button 49 on accessory device user interface 30. Upon detection of the accept of the first and second settings, the accessory device transmits a control signal indicative of user accept optionally together with the current first and second settings to the hearing device. The hearing device receives the control signal indicative of user accept and then applies the current first and second settings in the hearing device and/or stores the current first and second settings in a memory of the hearing device.

Figure 5:
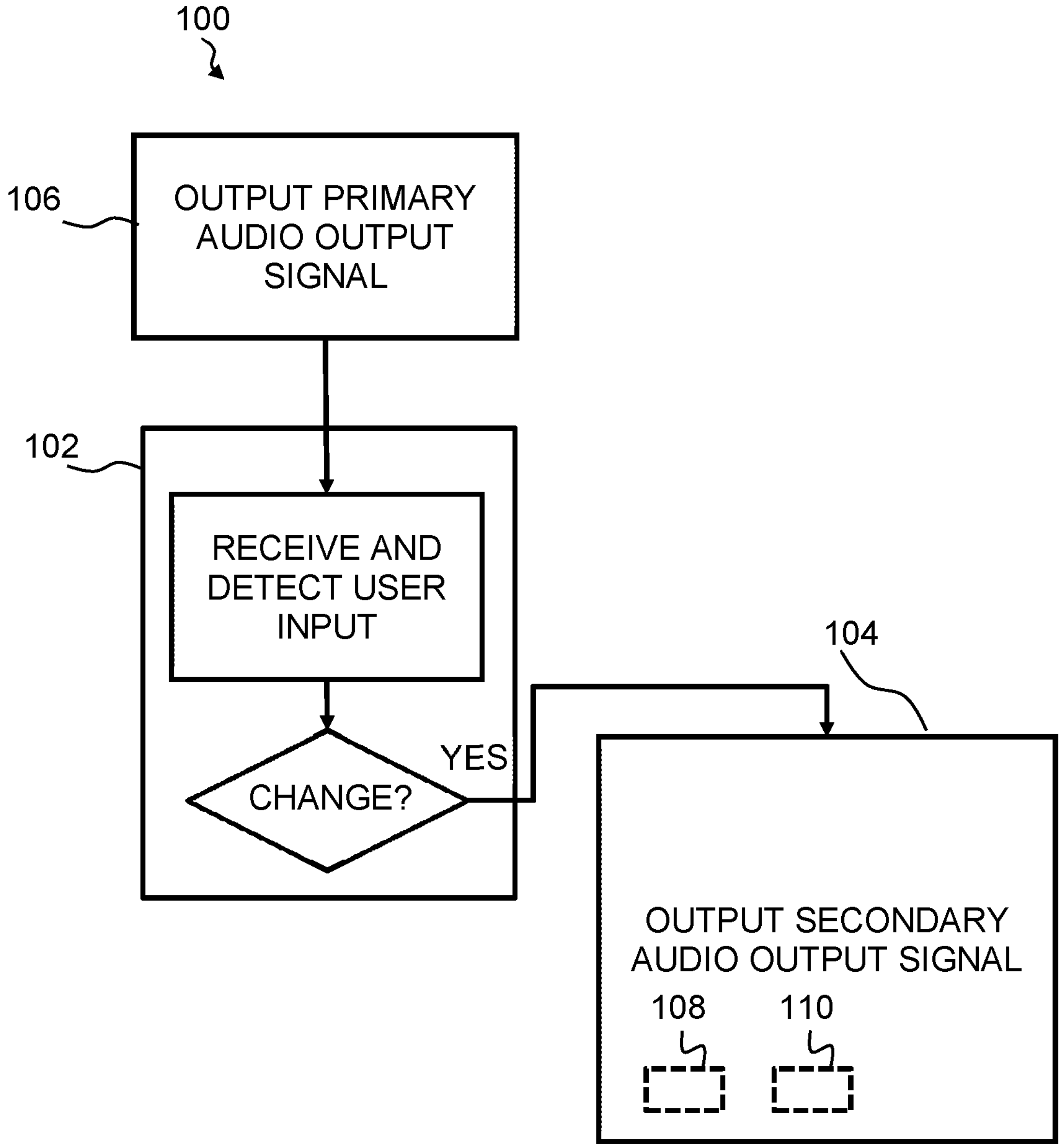
FIG. 5 schematically illustrates an exemplary method.

FIG. 5 is a flow diagram of an exemplary method of evaluating a setting of a hearing device in a hearing system comprising the hearing device, the hearing device comprising an input module for provision of a first input signal, the input module comprising a first microphone; a processor for processing the first input signal and provision of a processor output signal based on the first input signal; and a receiver for converting an output signal based on the processor output signal to an audio output signal. The method 100 comprises receiving and detecting 102 a user input indicative of a change from a first primary setting to a first secondary setting of the hearing device, and upon detection of the change from the first primary setting to the first secondary setting, outputting 104 a secondary audio output signal with the receiver according to the first secondary setting. Further, the method 100 comprises, prior to detection of the change from the first primary setting to the first secondary setting, outputting 106 a primary audio output signal according to the first primary setting.

In method 100, outputting 104 a secondary audio output signal with the receiver according to the first secondary setting optionally comprises determining and outputting 108 a secondary audio input signal with an accessory device. In method 100, outputting 104 a secondary audio output signal with the receiver according to the first secondary setting optionally comprises determining and wirelessly transmitting 110 a control signal with an accessory device, e.g. wherein the control signal is indicative of the first secondary setting.

Figure 6:
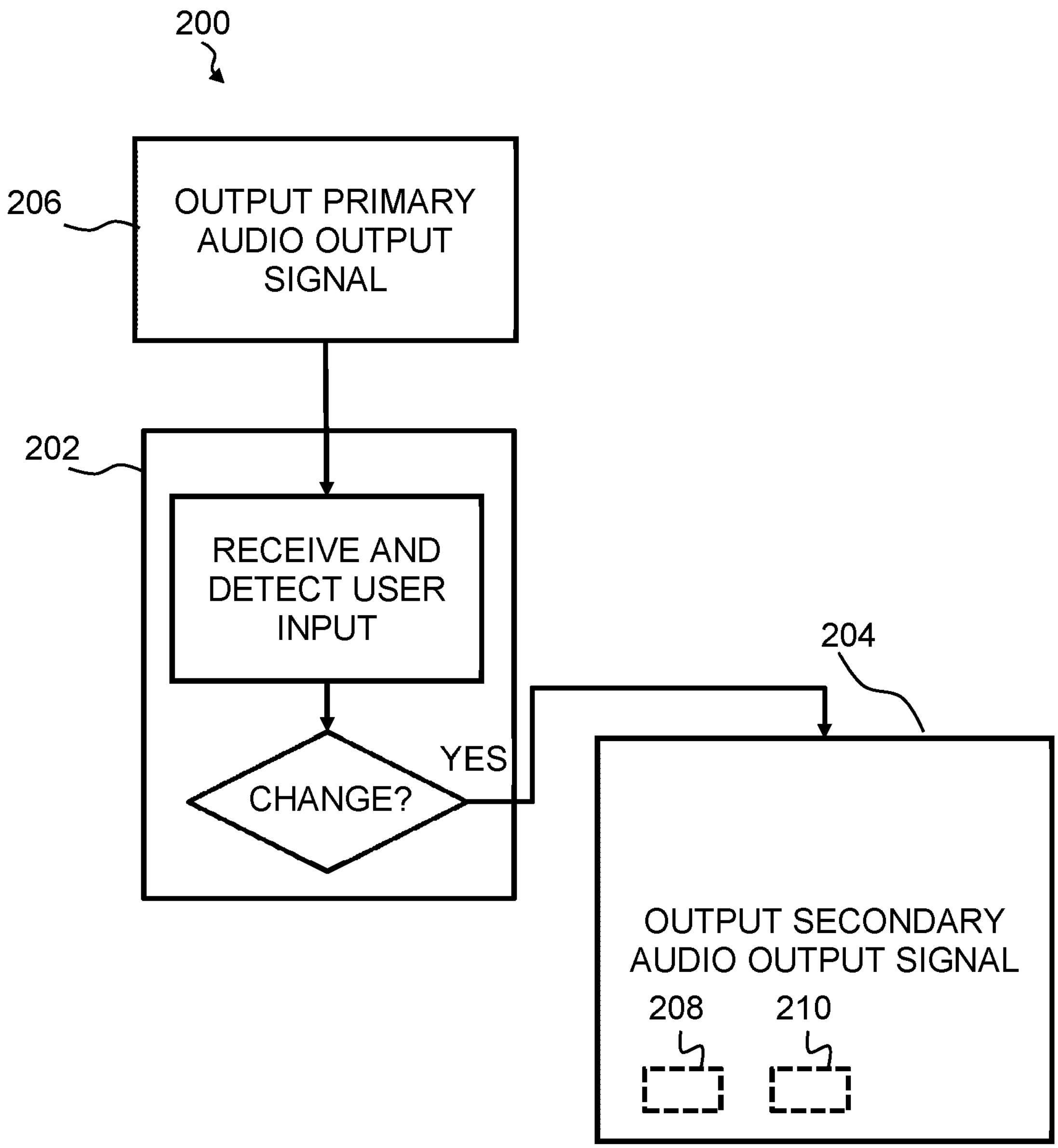
FIG. 6 schematically illustrates an exemplary method.

FIG. 6 is a flow diagram of an exemplary method of evaluating a setting of a hearing device in a hearing system comprising the hearing device, the hearing device comprising an input module for provision of a first input signal, the input module comprising a first microphone; a processor for processing the first input signal and provision of a processor output signal based on the first input signal; and a receiver for converting an output signal based on the processor output signal to an audio output signal. The method 200 comprises receiving and detecting 202 a user input indicative of a change from a first primary setting to a first secondary setting of the hearing device, and upon detection of the change from the first primary setting to the first secondary setting, outputting 204 a secondary audio output signal with the receiver according to the first secondary setting. Further, the method 200 comprises, prior to detection of the change from the first primary setting to the first secondary setting, outputting 206 a primary audio output signal according to the first primary setting.

In method 200, outputting 204 a secondary audio output signal with the receiver according to the first secondary setting optionally comprises determining and wirelessly transmitting 208 a secondary output signal with an accessory device. In method 200, outputting 204 a secondary audio output signal with the receiver according to the first secondary setting optionally comprises determining and wirelessly transmitting 210 a control signal with an accessory device, e.g. wherein the control signal is indicative of the first secondary setting.

The use of the terms "first", "second", "third" and "fourth", "primary", "secondary", etc. does not imply any order, but are included to identify individual elements. Moreover, the use of the terms first, second, etc. does not denote any order or importance, but rather the terms first, second, etc. are used to distinguish one element from another. Note that the words first, second, etc. are used here and elsewhere for labelling purposes only and are not intended to denote any specific spatial or temporal ordering unless otherwise indicated. Furthermore, the labelling of a first element does not imply the presence of a second element and vice versa.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES

1, 1A, 1B hearing system
2 hearing device
4, 4A, 4B 4C accessory device
6 transceiver module
8 antenna
10 transceiver/radio unit
12 input module
14 first input signal
16 first microphone
16A first microphone input signal
18 second microphone
18A second microphone input signal
20 beamforming module
20A beamform signal
22 processor
24 processor output signal
26 receiver
30 accessory device user interface
32 touch display
24 first virtual slider
36 handle
40 first position of handle
42 second position of handle
44 secondary output signal
46 control signal
47 start button
48 primary output signal
49 accept button
50 transceiver module of accessory device
54 loudspeaker of accessory device
56 secondary audio input signal
58 primary audio input signal
60 second virtual slider 62 handle
64 first position of handle
66 second position of handle
100 method of evaluating a setting of a hearing device in a hearing system
102 receiving and detecting a user input
104 outputting a secondary audio output signal with the receiver according to the first secondary setting
106 outputting a primary audio output signal according to the first primary setting
108 determining and outputting a secondary audio input signal with an accessory device
110 determining and wirelessly transmitting a control signal with an accessory device
200 method of evaluating a setting of a hearing device in a hearing system
202 receiving and detecting a user input
204 outputting a secondary audio output signal with the receiver according to the first secondary setting
206 outputting a primary audio output signal according to the first primary setting
208 determining and wirelessly transmitting a secondary output signal with an accessory device
210 determining and wirelessly transmitting a control signal with an accessory device

The invention claimed is:

1. A hearing system comprising a hearing device, the hearing device comprising:

an input module comprising a first microphone;

a processor coupled to the input module, the processor configured to provide a processor output signal; and a receiver for providing an audio output signal based on the processor output signal, the audio output signal being a primary audio output signal that has a first audio characteristic;

wherein the hearing system is configured to obtain a user input indicative of a desire to change from a first setting to a second setting of the hearing device, wherein a change from the first setting to the second setting of the hearing device comprises a change in one or more signal processing parameters of the hearing device;

wherein the hearing device is configured to, as a result of the hearing system obtaining the user input indicative of a desire to change from the first setting to the second setting, output a secondary audio output signal, and wherein the secondary audio output signal has a second audio characteristic that is different from the first audio characteristic of the first audio output; and wherein the hearing device is configured to output (1) the primary audio output signal having the first audio characteristic, and (2) the secondary audio output signal with the second audio characteristic that is different from the first audio characteristic of the first audio output, thereby allowing a user of the hearing device to compare a first listening experience before the user input is obtained, with a second listening experience after the user input is obtained;

wherein the secondary audio output signal is continuous.

2. The hearing system according to claim 1, wherein the primary audio output signal is based on the one or more signal processing parameters before the one or more signal processing parameters are changed.

3. The hearing system according to claim 1, wherein the hearing system comprises an accessory device wirelessly connectable to the hearing device, the accessory device comprising an accessory device user interface, the accessory device user interface configured to obtain the user input indicative of the desire to change from the first setting to the second setting of the hearing device.

4. The hearing system according to claim 3, wherein the accessory device is configured to, as a result of the hearing system obtaining the user input indicative of the desire to change from the first setting to the second setting of the hearing device:

determine a secondary output signal, wirelessly transmit the secondary output signal to the hearing device; and wherein the secondary audio output signal with the second audio characteristic is based on the secondary output signal wirelessly transmitted from the accessory device to the hearing device.

5. The hearing system according to claim 3, the accessory device comprising a loudspeaker, wherein the accessory device is configured to, as a result of the hearing system obtaining the user input indicative of the desire to change from the first setting to the second setting of the hearing device:

obtain an input signal, and output a sound via the loudspeaker based on the input signal, the secondary audio output signal being based on the sound from the loudspeaker of the accessory device.

6. The hearing system according to claim 3, wherein the accessory device is configured to, as a result of the hearing system obtaining the user input indicative of the desire to change from the first setting to the second setting, wirelessly transmit a control signal for controlling the hearing device to output the secondary audio output signal.

7. The hearing system according to claim 1, wherein the hearing device is configured to, as a result of the hearing system obtaining the user input indicative of the desire to change from the first setting to the second setting of the hearing device, select the secondary audio output signal from a plurality of audio output signals in a memory of the hearing device based on the second setting.

8. The hearing system according to claim 1, wherein the one or more signal processing parameters comprise one or more gain parameters of the hearing device.

9. The hearing system according to claim 1, wherein the one or more signal processing parameters comprise one or more filter parameters of the hearing device.

10. The hearing system according to claim 1, wherein the one or more signal processing parameters comprise one or more equalizer parameters of the hearing device.

11. The hearing system according to claim 1, wherein the one or more signal processing parameters of the hearing device comprise different signal processing parameters affecting how the processor of the hearing device performs sound processing.

12. The hearing system according to claim 1, wherein at least one of the one or more signal processing parameters is configured to compensate for a hearing loss of the user.

13. The hearing system according to claim 1, wherein the hearing device comprises a memory storing sound data, wherein the hearing device is configured to receive a control signal from an accessory device, and output the secondary audio output signal after receiving the control signal from the accessory device, and wherein the secondary audio output signal is based on the sound data stored in the memory of the hearing device.

14. The hearing system according to claim 1, wherein the hearing device comprises an antenna configured to receive sound signal and a control signal transmitted by an accessory device, wherein the hearing device is configured to output the secondary audio output signal based on the sound signal.

15. A hearing system comprising a hearing device, the hearing device comprising:

an input module comprising a first microphone;

a processor coupled to the input module, the processor configured to provide a processor output signal; and a receiver for providing an audio output signal based on the processor output signal, the audio output signal being a primary audio output signal that has a first audio characteristic;

wherein the hearing system is configured to obtain a user input indicative of a desire to change from a first setting to a second setting of the hearing device, wherein a change from the first setting to the second setting of the hearing device comprises a change in one or more signal processing parameters of the hearing device;

wherein the hearing device is configured to, as a result of the hearing system obtaining the user input indicative of a desire to change from the first setting to the second setting, output a secondary audio output signal, and wherein the secondary audio output signal has a second audio characteristic that is different from the first audio characteristic of the first audio output; and wherein the hearing device is configured to output (1) the primary audio output signal having the first audio characteristic, and (2) the secondary audio output signal with the second audio characteristic that is different from the first audio characteristic of the first audio output, thereby allowing a user of the hearing device to compare a first listening experience before the user input is obtained, with a second listening experience after the user input is obtained;

wherein the one or more signal processing parameters comprise one or more beamforming parameters of the hearing device.

16. A hearing system comprising a hearing device, the hearing device comprising:

an input module comprising a first microphone;

a processor coupled to the input module, the processor configured to provide a processor output signal; and a receiver for providing an audio output signal based on the processor output signal, the audio output signal being a primary audio output signal that has a first audio characteristic;

wherein the hearing system is configured to obtain a user input indicative of a desire to change from a first setting to a second setting of the hearing device, wherein a change from the first setting to the second setting of the hearing device comprises a change in one or more signal processing parameters of the hearing device;

wherein the hearing device is configured to, as a result of the hearing system obtaining the user input indicative of a desire to change from the first setting to the second setting, output a secondary audio output signal, and wherein the secondary audio output signal has a second audio characteristic that is different from the first audio characteristic of the first audio output; and wherein the hearing device is configured to output (1) the primary audio output signal having the first audio characteristic, and (2) the secondary audio output signal with the second audio characteristic that is different from the first audio characteristic of the first audio output, thereby allowing a user of the hearing device to compare a first listening experience before the user input is obtained, with a second listening experience after the user input is obtained;

wherein the one or more signal processing parameters comprise one or more noise cancellation parameters of the hearing device.

17. A hearing system comprising a hearing device, the hearing device comprising:

an input module comprising a first microphone;

a processor coupled to the input module, the processor configured to provide a processor output signal; and a receiver for providing an audio output signal based on the processor output signal, the audio output signal being a primary audio output signal that has a first audio characteristic;

wherein the hearing system is configured to obtain a user input indicative of a desire to change from a first setting to a second setting of the hearing device, wherein a change from the first setting to the second setting of the hearing device comprises a change in one or more signal processing parameters of the hearing device;

wherein the hearing device is configured to, as a result of the hearing system obtaining the user input indicative of a desire to change from the first setting to the second setting, output a secondary audio output signal, and wherein the secondary audio output signal has a second audio characteristic that is different from the first audio characteristic of the first audio output; and wherein the hearing device is configured to output (1) the primary audio output signal having the first audio characteristic, and (2) the secondary audio output signal with the second audio characteristic that is different from the first audio characteristic of the first audio output, thereby allowing a user of the hearing device to compare a first listening experience before the user input is obtained, with a second listening experience after the user input is obtained;

wherein the user input comprises a consent input indicating a consent to change from the first setting to the second setting of the hearing device.

18. A hearing system comprising a hearing device, the hearing device comprising:

an input module comprising a first microphone;

a processor coupled to the input module, the processor configured to provide a processor output signal; and a receiver for providing an audio output signal based on the processor output signal, the audio output signal being a primary audio output signal that has a first audio characteristic;

wherein the hearing system is configured to obtain a user input indicative of a desire to change from a first setting to a second setting of the hearing device, wherein a change from the first setting to the second setting of the hearing device comprises a change in one or more signal processing parameters of the hearing device;

wherein the hearing device is configured to, as a result of the hearing system obtaining the user input indicative of a desire to change from the first setting to the second setting, output a secondary audio output signal, and wherein the secondary audio output signal has a second audio characteristic that is different from the first audio characteristic of the first audio output; and wherein the hearing device is configured to output (1) the primary audio output signal having the first audio characteristic, and (2) the secondary audio output signal with the second audio characteristic that is different from the first audio characteristic of the first audio output, thereby allowing a user of the hearing device to compare a first listening experience before the user input is obtained, with a second listening experience after the user input is obtained;

wherein the user input comprises a null input indicating a lack of dissent to change from the first setting to the second setting of the hearing device.

19. A hearing system comprising a hearing device, the hearing device comprising:

an input module comprising a first microphone;

a processor coupled to the input module, the processor configured to provide a processor output signal; and a receiver for providing an audio output signal based on the processor output signal, the audio output signal being a primary audio output signal that has a first audio characteristic;

wherein the hearing system is configured to obtain a user input indicative of a desire to change from a first setting to a second setting of the hearing device, wherein a change from the first setting to the second setting of the hearing device comprises a change in one or more signal processing parameters of the hearing device;

wherein the hearing device is configured to, as a result of the hearing system obtaining the user input indicative of a desire to change from the first setting to the second setting, output a secondary audio output signal, and wherein the secondary audio output signal has a second audio characteristic that is different from the first audio characteristic of the first audio output; and wherein the hearing device is configured to output (1) the primary audio output signal having the first audio characteristic, and (2) the secondary audio output signal with the second audio characteristic that is different from the first audio characteristic of the first audio output, thereby allowing a user of the hearing device to compare a first listening experience before the user input is obtained, with a second listening experience after the user input is obtained;

wherein the first microphone of the hearing device is configured to receive sound emitted from a speaker of an accessory device, and wherein the secondary audio output signal outputted by the hearing device is based on the received sound emitted from the speaker of the accessory device.

20. The hearing system according to claim 19, wherein the hearing device is configured to receive a control signal from the accessory device.

21. The hearing system according to claim 19, wherein the sound emitted from the speaker of the accessory device is constant.

22. An accessory device for a hearing system that comprises a hearing device, the hearing device configured to provide a primary audio output signal having a first audio characteristic, the accessory device comprising:

an accessory device user interface and a processor, wherein the accessory device user interface is configured to obtain a user input indicative of a desire to change from a first setting to a second setting of the hearing device, wherein the change from the first setting to the second setting of the hearing device comprises a change in one or more signal processing parameters of the hearing device, and wherein the processor is configured to, as a result of the accessory device user interface obtaining the user input indicative of the desire to change from the first setting to the second setting, control the hearing device to output a secondary audio output signal, and wherein the secondary audio output signal has a second audio characteristic that is different from the first audio characteristic of the primary audio output signal;

wherein the accessory device is configured to control the hearing device to output the secondary audio output signal with the second audio characteristic after the primary audio output signal with the first audio characteristic is outputted, thereby allowing a user of the hearing device to compare a first listening experience before the user input is obtained, with a second listening experience after user input is obtained; and wherein the secondary audio output signal is continuous.

23. The accessory device according to claim 22, wherein at least one of the one or more signal processing parameters is configured to compensate for a hearing loss of the user.

24. The accessory device according to claim 22, wherein the one or more signal processing parameters comprise one or more gain parameters of the hearing device.

25. The accessory device according to claim 22, wherein the one or more signal processing parameters comprise one or more filter parameters of the hearing device.

26. The accessory device according to claim 22, wherein the one or more signal processing parameters comprise one or more beamforming parameters of the hearing device.

27. The accessory device according to claim 22, wherein the one or more signal processing parameters comprise one or more noise cancellation parameters of the hearing device.

28. The accessory device according to claim 22, wherein the one or more signal processing parameters comprise one or more equalizer parameters of the hearing device.

29. The accessory device according to claim 22, wherein the user input comprises a consent input indicating a consent to change from the first setting to the second setting of the hearing device.

30. The accessory device according to claim 22, wherein the user input comprises a null input indicating a lack of dissent to change from the first setting to the second setting of the hearing device.

31. A hearing system comprising a hearing device, the hearing device comprising:

an input module comprising a first microphone;

a processor coupled to the input module, the processor configured to provide a processor output signal; and a receiver for providing an audio output signal based on the processor output signal, the audio output signal being a primary audio output signal having a first audio characteristic;

wherein the hearing system is configured to obtain a user input indicative of a desire to change from a first setting to a second setting of the hearing device, wherein the change from the first setting to the second setting of the hearing device comprise a change in one or more signal processing parameters of the hearing device; and wherein the hearing device is configured to, as a result of the hearing system obtaining the user input indicative the desire to change from the first setting to the second setting, output a secondary audio output signal;

wherein the secondary audio output signal has a second audio characteristic that is different from the first audio characteristic of the primary audio output signal;

wherein the secondary audio output signal outputted by the hearing device is based on sound data stored in a memory of the hearing device, or based on sound emitted from a speaker of an accessory device, or based on sound signal transmitted by the accessory device and received by an antenna of the hearing device; and wherein the secondary audio output signal is continuous.

32. The hearing system according to claim 31, wherein the one or more signal processing parameters comprise one or more beamforming parameters of the hearing device.

33. The hearing system according to claim 31, wherein the one or more signal processing parameters comprise one or more gain parameters of the hearing device.

34. The hearing system according to claim 31, wherein the one or more signal processing parameters comprise one or more equalizer parameters of the hearing device.

35. The hearing system according to claim 31, wherein the user input comprises a consent input indicating a consent to change from the first setting to the second setting of the hearing device.

36. The hearing system according to claim 31, wherein the user input comprises a null input indicating a lack of dissent to change from the first setting to the second setting of the hearing device.

37. An accessory device for a hearing system that comprises a hearing device, the hearing device configured to provide a primary audio output signal having a first audio characteristic, the accessory device comprising:

an accessory device user interface and a processor, wherein the accessory device user interface is configured to obtain a user input indicative of a desire to change from a first setting to a second setting of the hearing device, wherein the change from the first setting to the second setting of the hearing device comprise a change in one or more signal processing parameters of the hearing device, and wherein the processor is configured to, as a result of the accessory device user interface obtaining the user input indicative of the desire to change from the first setting to the second setting, control the hearing device to output a secondary audio output signal;

wherein the secondary audio output signal has a second audio characteristic that is different from the first audio characteristic of the primary audio output signal;

wherein the secondary audio output signal is based on sound data stored in a memory of the hearing device, or based on sound emitted from a speaker of the accessory device, or based on sound signal transmitted by the accessory device and received by an antenna of the hearing device; and wherein the secondary audio output signal is continuous.

38. The accessory device according to claim 37, wherein the one or more signal processing parameters comprise one or more beamforming parameters of the hearing device.

39. The accessory device according to claim 37, wherein the one or more signal processing parameters comprise one or more gain parameters of the hearing device.

40. The accessory device according to claim 37, wherein the one or more signal processing parameters comprise one or more equalizer parameters of the hearing device.

41. The accessory device according to claim 37, wherein the user input comprises a consent input indicating a consent to change from the first setting to the second setting of the hearing device.

42. The accessory device according to claim 37, wherein the user input comprises a null input indicating a lack of dissent to change from the first setting to the second setting of the hearing device.

* * * * *